Figure 1:
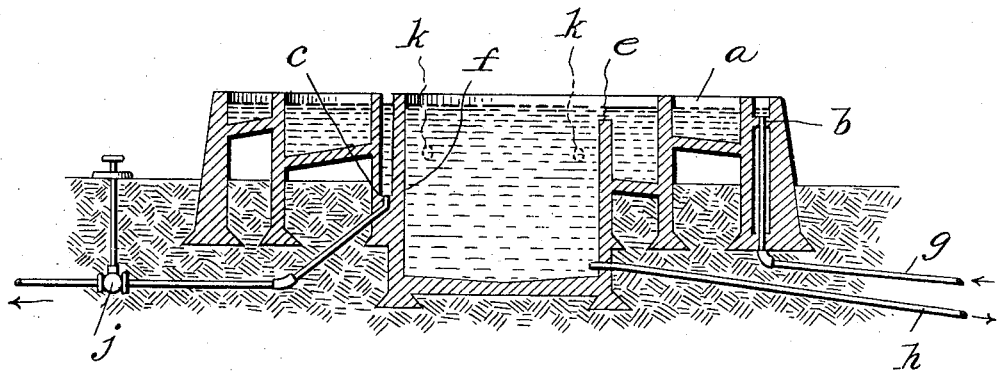

F. W. KEENEY & J. M. PERKINS.
SEDIMENTATION BASIN.
APPLICATION FILED DEC. 12, 1916.

1,226,893.

Patented May 22, 1917.

UNITED STATES PATENT OFFICE.

FRED W. KEENEY AND JOSEPH M. PERKINS, OF OKLAHOMA, OKLAHOMA.

SEDIMENTATION-BASIN.

1,226,893.  Specification of Letters Patent.  Patented May 22, 1917.

Application filed December 12, 1916. Serial No. 136,448.

*To all whom it may concern:*

Be it known that we, FRED W. KEENEY and JOSEPH M. PERKINS, citizens of the United States of America, and residents of Oklahoma, county of Oklahoma, State of Oklahoma, have invented certain new and useful Improvements in Sedimentation-Basins, of which the following is a full and clear specification.

The object of this invention is to provide a simply constructed apparatus which will effectually accomplish the sedimentation action because of the complete elimination of all baffles, weirs, sharp turns, or other obstructions which would cause eddies or currents and thus would retard the deposition of the sediments, as more fully hereinafter set forth.

In the drawing—

Figure 2:
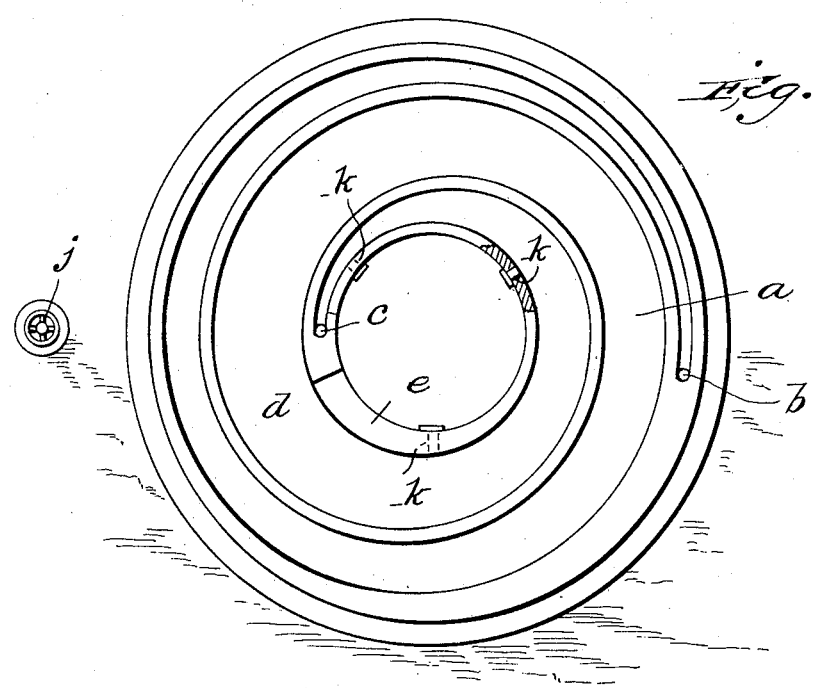

Figure 1 is a vertical sectional view and Fig. 2 a plan view of a structure embodying our invention.

Referring to the drawing annexed by reference characters, $a$ designates a spirally arranged channel having an inlet at $b$ for the liquid that is to be clarified and an outlet $c$ for the sludge or sediment. This channel gradually increases in width and depth from the inlet $b$ to point $d$, where the inner wall of the channel is cut away (at $e$) to permit the clarified liquid to overflow into a central receiving-well $f$. From the point $d$ the channel gradually narrows and deepens to the aforesaid sediment-discharging exit $c$. This channel also inclines gradually downwardly from its inlet to its outlet $c$.

The liquid to be clarified is pumped or otherwise supplied to the inlet through a suitable pipe line $g$, and thence the liquid flows with a gradually decreasing speed to the point $d$, this decrease in speed being caused by the gradual increase in cross-sectional area of the channel. This decrease in the speed of flow as well as the elimination of all sharp corners and other obstructions insures a high degree of sedimentation before the clarified liquid overflows into the receiving well $f$. Clarified liquid may be drawn from the well $f$ in any suitable manner through discharge pipe $h$. The wall of the spiral channel may be constructed of any suitable material; we prefer constructing it of reinforced concrete or brick.

When the sediment has accumulated on the bottom of the channel to a sufficient extent to require it to be removed, this removal may be readily accomplished by opening a valve $j$ in a pipe line connected to the outlet $c$, whereupon a continuous movement of the liquid from the inlet to the outlet will be obtained, and this flow of liquid will carry with it the deposited sediment. When this washing-out operation is performed, it is desirable that the level of the liquid shall be kept at such a point that all the inflowing liquid will pass out at the discharge $c$ and not overflow into the receiving-well $f$; in order to assist in accomplishing this washing-out operation quickly and thoroughly, we prefer inclining the bottom wall of the channel outwardly and downwardly, as shown, in order that the scouring action will be facilitated by the centrifugal action of the liquid, as is obvious.

In the wall of the central well $f$, we prefer to form three or more equally-spaced openings $k$ at a point above where the sludge or sediment will deposit. These ports may be closed by plugs, as shown, or any other suitable closure devices. Before discharging the sludge at $c$, these holes may be opened to permit the clear liquid to be drained into the clear-liquid-well, thereby avoiding wasting a considerable quantity of partially clarified liquid every time the basin is flushed out.

It will be understood that the clear-liquid-well may be used merely as a receiving-well for clarified liquid, as shown, or that within it may be constructed or arranged any suitable type of filtering bed or apparatus.

Having thus described our invention, what we claim is:

1. In an apparatus of the class set forth, a sedimentation channel having an overflow or discharge point and being spirally arranged and increasing in width and depth as well as inclining downwardly from its inlet end to its overflow or discharge point.

2. In an apparatus of the class set forth, a sedimentation channel having an overflow point as well as a sludge-discharge point and being spirally arranged and increasing in width and depth as well as inclining downwardly from its inlet end to its overflow or discharge point, said channel from said overflow or discharge point being gradually decreased in width and increased in depth toward the discharge point of the sediment or sludge.

3. In an apparatus of the class set forth, a sedimentation channel having an overflow point as well as a sludge-discharge point and being spirally arranged and increasing in width and depth as well as inclining downwardly from its inlet end to its overflow or discharge point, said channel from said overflow or discharge point being gradually decreased in width and increased in depth toward the discharge point of the sediment or sludge, a central receiving chamber or well being provided for the reception of the clarified overflow liquid.

4. In an apparatus of the class set forth, a sedimentation channel having an overflow point as well as a sludge-discharge point and being spirally arranged and increasing in width and depth as well as inclining downwardly from its inlet end to its overflow or discharge point, said channel from said overflow or discharge point being gradually decreased in width and increased in depth toward the discharge point of the sediment or sludge, a central receiving chamber or well being provided for the reception of the clarified overflow liquid, the wall of said receiving chamber or well being provided with an opening or openings having removable closures at a point above the normal line of the sludge deposit.

In testimony whereof we hereunto affix our signatures this 24 day of November. 1916.

FRED W. KEENEY.
JOSEPH M. PERKINS.

Witness:
LESLIE C. HANSON.